United States Patent

Wentzell et al.

[11] Patent Number: 5,720,124
[45] Date of Patent: Feb. 24, 1998

[54] OVERBOARD BAIT-CUTTING AND CHUMMING DEVICE

[76] Inventors: Kyrt M. Wentzell, 561 Suzanne Dr., Biloxi, Miss. 39532; Edward S. Wentzell, 2180 Beach Blvd., Apt. 26E, Biloxi, Miss. 39531

[21] Appl. No.: 661,740

[22] Filed: Jun. 11, 1996

[51] Int. Cl.$^6$ ................................................. A01K 97/02
[52] U.S. Cl. .................................................. 43/44.99
[58] Field of Search ................................... 43/44.99

[56] References Cited

U.S. PATENT DOCUMENTS

| | | |
|---|---|---|
| 2,465,127 | 3/1949 | Stark. |
| 2,709,317 | 5/1955 | Pease, Sr.. |
| 2,713,744 | 7/1955 | Strausser, Sr.. |
| 2,719,382 | 10/1955 | Schacte. |
| 2,729,912 | 1/1956 | Moffett. |
| 4,138,794 | 2/1979 | Chiodini. |
| 4,685,242 | 8/1987 | Stanish. |
| 4,959,921 | 10/1990 | Stanish et al.. |

FOREIGN PATENT DOCUMENTS

| | | |
|---|---|---|
| 839461 | 4/1939 | France. |
| 20 34 621 | 1/1972 | Germany. |
| 24 07 154 | 8/1975 | Germany. |

Primary Examiner—Kurt Rowan
Attorney, Agent, or Firm—Richard C. Litman

[57] ABSTRACT

A device for attracting fish by chumming which when filled with whole bait and manually reciprocatingly agitated overboard causes the bait to be cut to create a chum slick. An elongated rigid tubular body defining an inner chamber for receiving whole bait is provided further having a plurality of perforations which allow diffusion of resulting chum. An enlarged side port opening with removable plug is provided for loading the whole bait into the chamber. Rigid first and second plugs are removably inserted into each open end of the tubular body and each defines a through bore. Each such bore is disposed along the same axis for passage of an elongated rigid shaft. The shaft has a first end portion and neck extending a predetermined length beyond the first plug and terminating in an elongated handle portion for grasping; the shaft also extends beyond the second plug. The shaft is limited in reciprocal travel through both bores by a pair of stop members disposed on the shaft. A blade assembly is affixed to the shaft within the chamber. By immersing the tubular body into the water and vigorously manually plunging and pulling the handle, the shaft is caused to reciprocate within the chamber while the tubular body is buoyed by the water, thereby causing the bait fish to be minced by the cutting blades. Biasing mechanisms are provided to cushion the reciprocating action of the shaft relative to the tubular body.

15 Claims, 3 Drawing Sheets

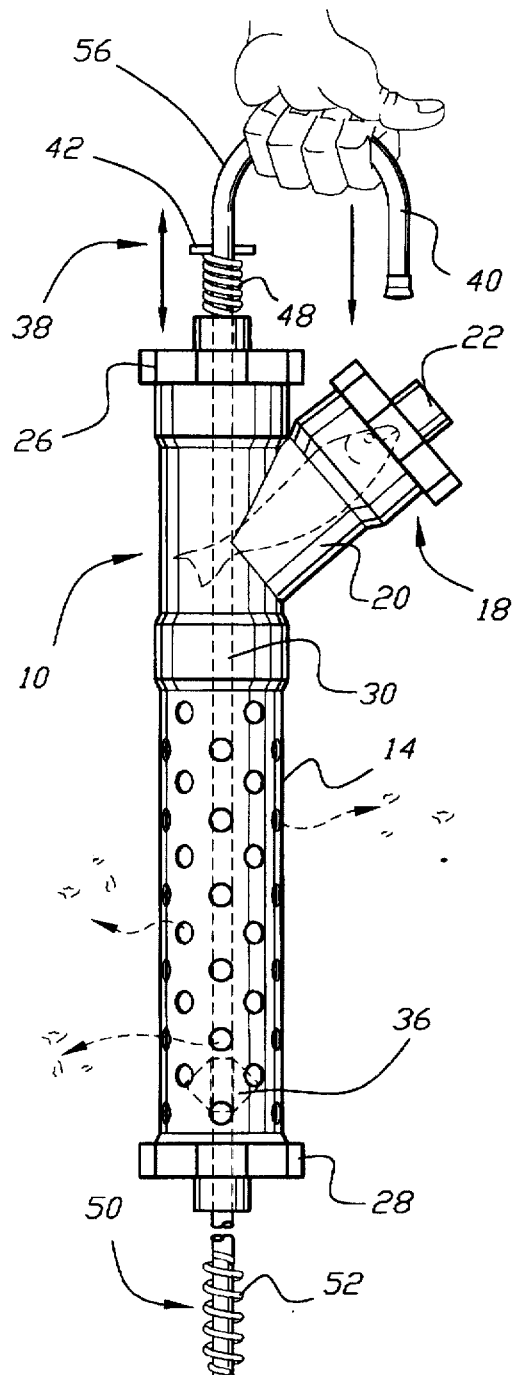
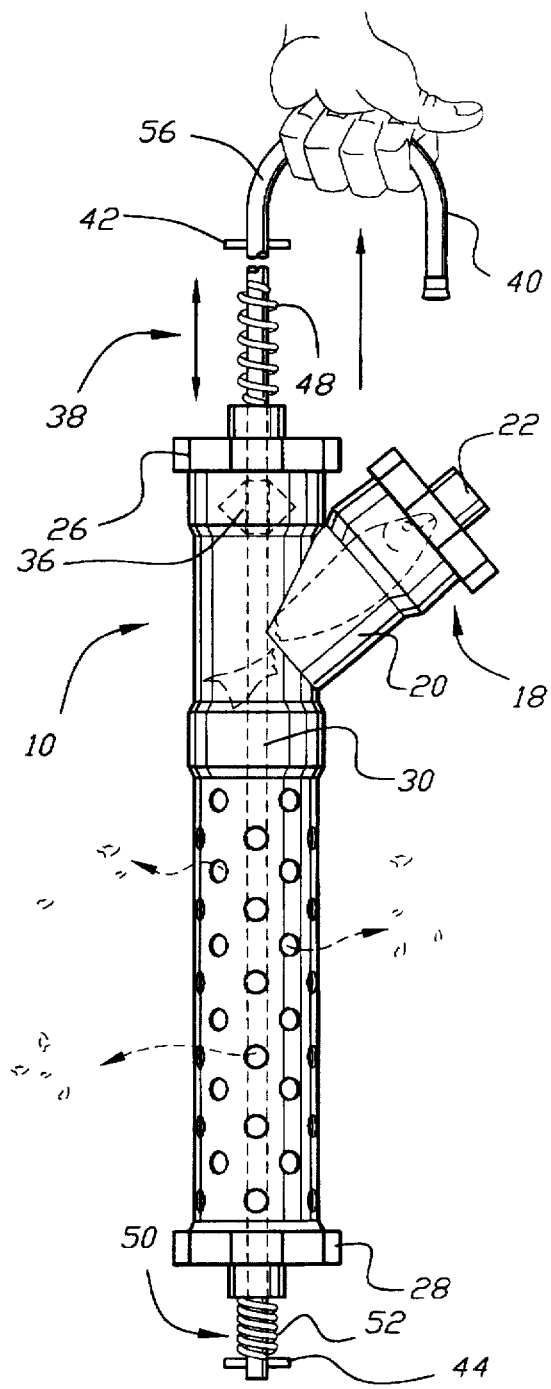

OVERBOARD BAIT-CUTTING AND CHUMMING DEVICE

BACKGROUND OF THE INVENTION

1. Field of the Invention

The present invention relates to devices for attracting fish by chumming, more particularly, a device which is filled with whole bait and when manually reciprocatingly agitated overboard causes the bait to be cut to create a chum slick.

2. Description of the Prior Art

Chumming is a method usually used to attract big game fish to an area where an angler has dropped his hooked fishing line into the water. Typically, chum is manually prepared by placing bait fish into a mesh bag, suspending the tied bag in the water from the boat, and then beating it vigorously while suspended to create a fresh chum slick which emanates from the bag. A splattered mess ensues onboard, especially when the bag is retrieved for refilling or refreshing. When the chumming bag is no longer needed, the bag and its contents are often cut loose, an environmentally unfriendly practice.

Such a chumming method requires a significant time investment and continued attention to the chumming which could otherwise be spent fishing. Alternatively, meat grinders may also be used to prepare a suitably minced fresh fish chum for dispersal using chum pots. As a second alternative, chum may also be purchased frozen or dried which, although less time consuming, is costly, is quickly used, and is not as fresh, thus less attractive to the fish.

Various chum dispensers or chum pots which accept preground chum are well known in the prior art. Each employs a generally cylindrical housing having perforations which allows the chum to diffuse out of the housing. In addition to the above noted disadvantages of dry and frozen chum, the pots have the further disadvantage that even fresh chum becomes more stale the longer it sits in the pot, thus losing its effectiveness as a fish attractant. Exemplary of such perforated cylinders include a surf chum pot, U.S. Pat. No. 2,713,744 issued Jul. 26, 1995 to Strausser, Sr.; a chum holder doubling as a sinker, U.S. Pat. No. 2,709,317 issued May 31, 1955 to Pease, Sr.; bait juice dispensers, one employing a sponge, U.S. Pat. No. 4,138,794 issued Feb. 13, 1979 to Chiodini, and another having controlled valve openings, U.S. Pat. No. 2,465,127 issued Mar. 22, 1949 to Stark; removably shielded chum baskets, as shown in both U.S. Pat. No. 2,729,912 issued Jan. 10, 1956 to Moffett and German Offenlegungsschrift No. 2,034,621 published Jan. 27, 1972; and, a bait pot having a spring biased terminal attachment member, French Brevet D'Invention No. 839, 461 published Apr. 4, 1939 by Dannequin. Although German Offenlegungsschrift No. 2,407,154 published Aug. 28, 1975 shows a perforated cylinder, the patent teaches its use as a means to promote the swallowing of a baited hook and not for chumming.

To overcome some of the inherent disadvantages of each of such methods of chumming and associated chum pots, other chumming devices having internally disposed blades or agitating devices were developed which are intended to be towed or otherwise suspended overboard to actuate the cutting or agitating mechanisms. For example, U.S. Pat. No. 2,719,382 issued Oct. 4, 1955 to Schachte describes a towed chum dispenser providing a cylinder having a central shaft having loops which can agitate and separate preground chum by its up and down movement and thus cause the chum to dispense through holes in the cylinder. Coiled springs are disposed terminally as return springs to create a bias which returns the cylinder to its resting position as the device is buoyed in the water.

U.S. Pat. No. 4,685,242 issued Aug. 11, 1987 to Stanish also describes a towed chum dispenser having a perforated cylindrical container having two end caps, but wherein a first end cap has a stabilizer. A cutting blade is set coaxially movable within the container on a cable passing through each end cap. The free end of the cable is attached to a weight which tensions the cable to cause it to rise and fall with the wave action affecting the boat. The stabilizer effectively holds the cylinder stationery within the water as the cutting blade reciprocates within the cylinder shredding the bait fish housed therein. A variation is described in U.S. Pat. No. 4,959,921 issued to Stanish et al., which utilizes a shaft and propeller which when towed through the water causes an blade housed within the cylinder to rotate.

Although each of these devices generally show cutting blades which are used to mince fresh bait fish while the device is in tow or suspended in an actively moving body of water, none are easily manually operated to allow monitoring of the chum slick. Moreover, in calm seas or when the boat is at rest on the surface, the prior inventions will fail to release a substantial amount of chum. Hence, a need exists for a manually operated chumming device which is easily operated, easy to clean, easy to fill and provides the freshest possible chum slick.

None of the above inventions and patents, taken either singly or in combination, is seen to describe the instant invention as claimed.

SUMMARY OF THE INVENTION

The present invention relates to devices for attracting fish by chumming, more particularly, a device which is filled with whole bait and when manually reciprocatingly agitated overboard causes the bait to be cut to create a chum slick. The device includes an elongated rigid tubular body, having a first open end and a second open end and defining an inner chamber for receiving whole bait, and further having a plurality of perforations therein which allow diffusion of chum resulting from the cutting of the whole bait within the chamber. An enlarged side port opening with removable plug is provided for loading the bait into the chamber.

A rigid first plug is removably inserted into the first open end of the tubular body and defines a first through bore; a rigid second plug is likewise removably inserted into the second open end and defines a second through bore. Each such bore is disposed along the same axis for passage of an elongated rigid shaft. The shaft has a first end portion and neck extending a predetermined length beyond the first plug and terminating in an elongated handle portion for grasping, and also extends beyond the second plug. The shaft is limited in reciprocal travel by a pair of stop members disposed on the shaft. A blade assembly is affixed to the shaft within the chamber of the tubular body for mincing of the bait.

By immersing the tubular body into the water and vigorously manually plunging and pulling the handle, the shaft is caused to reciprocate within the chamber while the tubular body is buoyed by the water, thereby causing the bait to be minced by the cutting blades. An added benefit of the reciprocating shaft structure is its ability to create an underwater thrashing sound which is attractive to fish. Biasing mechanisms are provided to cushion the reciprocating action of the shaft relative to the tubular body and minimize the shock of the shaft against the stop members.

Accordingly, it is a principal object of the invention to provide a chumming device capable of cutting whole bait by manually operated reciprocating action.

It is another object of the invention to provide a chumming device with separate means by which to fill the bait receiving chamber.

It is a further object of the invention to provide a chumming device with means allowing easy disgorgement of remaining bait fish from the bait receiving chamber.

Still another object of the invention is to provide a chumming device with means which allows both suspension of the device from the side of a boat and manual grasping.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3. is an environmental side view of the bait cutting and chumming device in use with the blade in a first position.

FIG. 4. is an environmental side view of the bait cutting and chumming device in use with the blade in a opposite second position.

Similar reference characters denote corresponding features consistently throughout the attached drawings.

DETAILED DESCRIPTION OF THE PREFERRED EMBODIMENT

The present invention relates to devices for attracting fish by chumming, more particularly, a device which is filled with whole bait and when manually reciprocatingly agitated overboard causes the bait to be cut to create a chum slick. The present invention may be better understood by appreciating a summary of its operation first. The device can be filled with whole bait, such as fish or squid, by removing a side port plug and passing the whole bait into the chamber of a perforated tubular body. Upon replacing the port plug, the device is grasped by a handle portion connected to a shaft having a cutting blade passing within the chamber and tubular body and suspended into the water such that at least the perforated tubular body is immersed. By vigorously manually plunging and pulling the handle, the shaft is caused to reciprocate within the chamber while the tubular body is buoyed by the water, thereby causing the bait fish to be minced by the cutting blades and further causing an thrashing sound attractive to fish.

Figure 1:
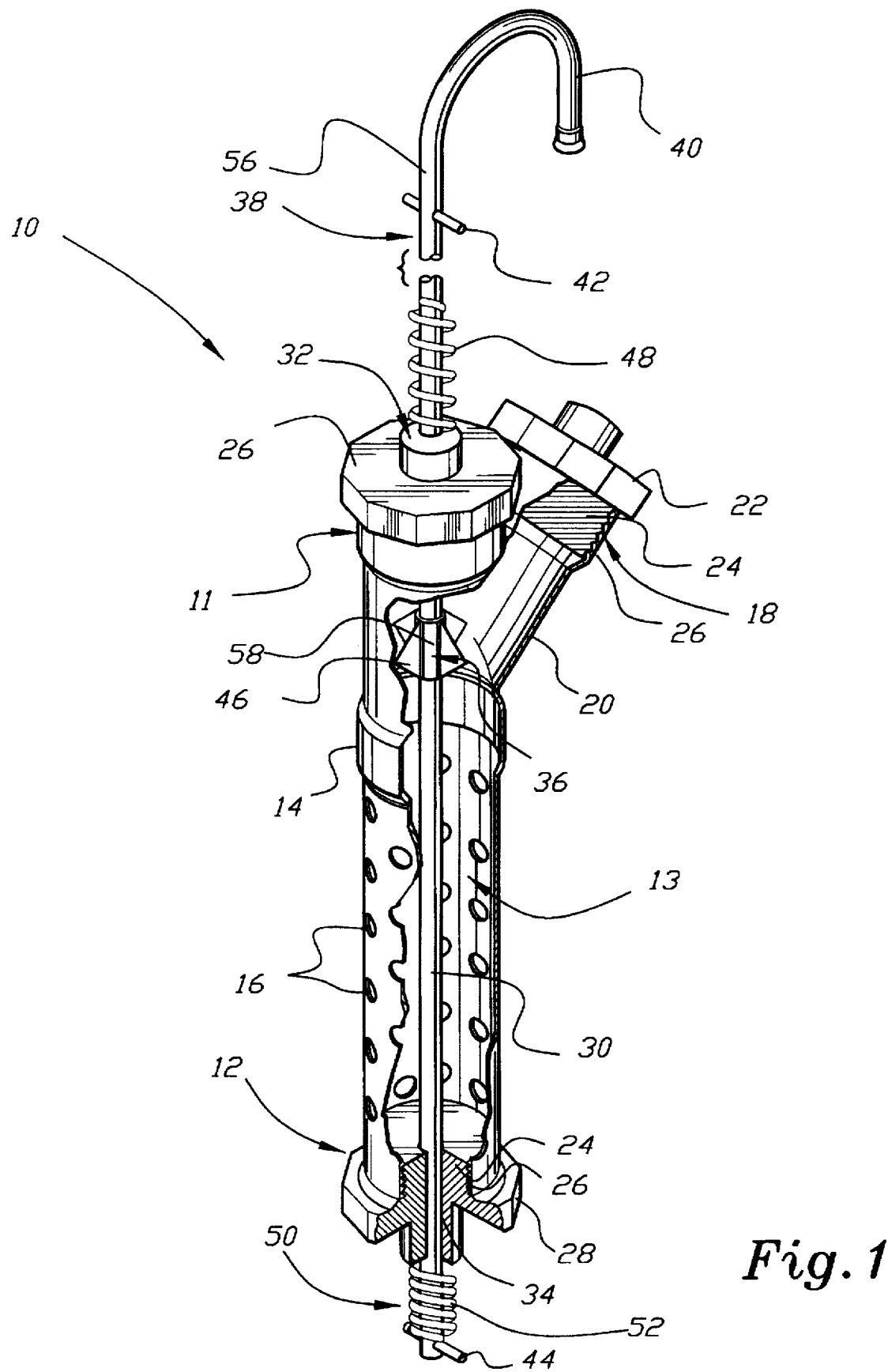
FIG. 1 is fragmented perspective view of the bait cutting and chumming device having a wall broken away to show its internal components.

Referring now to FIG. 1, the preferred embodiment of the bait cutting and chumming device 10 is shown in a partially fragmented view to show both the internal and external features intended to accomplish such an operation.

The device 10 includes an elongated rigid tubular body 14, having a first open end 11 and a second open end 12 and defining an inner chamber 13 for receiving whole fish or other whole bait suitable for use in attracting fish when chumming. The tubular body 14 further defines a plurality of limiting perforations 16 to permit passage of smaller pieces of bait and fluids comprising a chum slick. Such perforations 16 are preferably disposed below an enlarged port opening 18 defined in a side of said tubular body 14, designed specifically for receiving bait fish without the need to alter the remaining assembly configuration of the device 10.

In the preferred embodiment, such port opening 18 includes a tubular wall 20 depending from the tubular body 14 at an acute angle opening toward the first open end 11, thereby forming the shown Y-configuration. A removable port plug 22 for occluding the port opening 18 is provided having external threads 24 matingly adapted to internal threads 26 provided on the tubular wall 20; such configuration allows a user to simply screw-on or screw-off the port plug 22 to load the chamber 13 with whole bait. However, it can be envisioned in other embodiments that the port opening 18 may also be reduced in size and configuration by eliminating part or all of the tubular wall 20, leaving the port plug 22 and a side wall opening in the tubular body 14 for receiving the port plug 22.

The tubular body 14 also receives a rigid first plug 26 removably inserted into the first open end 11 and a rigid second plug 28 removably inserted into the second open end 12. As shown by the fragmented view of the second open end 12 of the preferred embodiment in FIG. 1, the tubular body 14 is provided with an internal thread 26 for receiving the mating external thread 24 of the second plug 28. These securing means allow the plugs 26,28 to remain securely seated in the first open end 11 and second open end 12 of the tubular body 14 during chumming and, as will be appreciated more fully after discussion of the operation of the device below, capable of withstanding the vigorous reciprocating motion manually exerted upon the device in order to operate it and achieve a cutting action within the chamber 13. Moreover, when the chumming operation is terminated, the threaded plugs 26,28 allow a user to simply screw-off each plug to empty any remaining or expended chum or bait from the chamber 13 and gain access to easily clean the tubular body 14.

The materials used to manufacture the tubular body 14 and plugs 22,26,28 may be any rigid and water and corrosion resistant material. Preferably a plastic, such as polyvinylchloride (PVC), is used, which material is impact resistant and therefore capable of withstanding the noted vigorous operation. Also, PVC allows extrusion molding of the product, is chemically weldable, and is easy to cut, drill or otherwise manipulate during the manufacturing or assembly of the device. Obviously, the diameter of the tubular body 14 may also be increased to accommodate any volume of bait and may match preexisting PVC piping stock standard sizes. Nevertheless, other less desirable plastics, metals, or suitable materials may be substituted.

Each first plug 26 and second plug 28 defines a bore for passage of a cutter shaft 30 through the chamber 13 and beyond each first plug 26 and second plug 28. The second through bore 34, as shown in FIG. 1 defined by the fragmented second plug 28, is disposed in parallel relation to a longitudinal axis passing within said elongated rigid tubular body 14, such axis corresponding to the path of the shaft 30 as shown in FIG. 1. The first through bore 32 is disposed along the same said parallel longitudinal axis and is aligned with the second through bore 34 so as to permit passage of the linear cutter shaft 30.

The shaft 30 is rigid, preferably made of corrosion-resistant pipe stock, preferably aluminum pipe having a sufficiently thick wall to provide rigidity and strength under normal operation. The shaft 30 includes a necessarily linear portion which passes in a straight line through the chamber 11 and both the first through bore 32 and the second through bore 34 and extends beyond both bores to permit a sliding, reciprocating motion of the shaft 30 through both bores. This reciprocating action is a necessary function of the shaft, not only to cut the bait, but to create an underwater thrashing sound which is attractive to fish.

A cutting blade assembly 36 is immovably affixed to the shaft 30 within chamber 13 of the tubular body 14. During the reciprocating action of the shaft 30, the cutting blade assembly 36 is therefore also in motion. The blade assembly 36 is allowed to reciprocate within the full length of the chamber 13 whereby each pass of a blade 46 across a bait fish contained with the chamber 13 causes the blade 46 to mince the fish into chum and causes the chum, oils and body fluids to escape from the chamber 13 by way of the perforations 16.

It should be noted that the blade assembly 36 may be rotated as well as reciprocated by rotating the shaft 30 relative to the tubular body 14. Such action allows the blade position to be randomly altered to mince undisturbed areas of bait and aid the diffusion of chum by stirring the mixture. Moreover, the blade assembly 36 includes a band 58 which encircles shaft 30 and by which the assembly is affixed to the shaft. From band 58 a plurality of blades 46 depend radially. The radial length of the blade 46 may be varied to approximate the cross-sectional width of the chamber 13. Each blade 46 is generally triangular to effectively increase the cutting edge surface area for ease of operation of the device when the chamber 13 is loaded with bait.

In order that blade assembly 36 not make contact with either plug 26,28 while reciprocating within the chamber, a unidirectional movement of the shaft 30 is halted by one of a pair of stop members at a predetermined location. A first stop member 42 is positioned along the linear portion of the shaft 30 at a first travel limit and a second stop member 44 is positioned along the linear portion of the shaft 30 at a second travel limit. The first stop member 42 prevents passage of the shaft 30 through the first through bore 32 of first plug 26; likewise, the second stop member 42 prevents passage of the shaft 30 through the second through bore 32 of second plug 26. Each of the stop members 44,42 may be removable pins passed through a receiving bore defined diametrically through the shaft 30. Such a removable feature allows the shaft to be disassembled from the remainder of the device when desired.

As can be understood by referring to FIG. 3, the first travel limit is defined by the blade assembly 36 being positioned at a predetermined, fixed location of a distance relative to the first stop member 42 such that the blade assembly 36 is proximate to, but free of, contact with the second plug 28 and the first stop member 42 is proximate to and in contact with outer surface of the first plug 26 or elements extending its outer surface, such as coil spring 48. While the position of blade assembly 36 is nearest the second plug 28, a second state of maximal shaft extension exists wherein the first end portion 38 of shaft 30 is fully retracted relative to the first plug 26 and a second end portion 50 correspondingly extends fully beyond the second plug 28.

Likewise, and as can be appreciated from FIG. 4, a second stop member 44 is provided at the end of the shaft 30 and proximate to the second plug 28. The second travel limit is defined by the blade assembly 36 being positioned at the same predetermined, fixed location, but having a distance relative to the second stop member 44 such that the blade assembly 36 is proximate to, but free of, contact with the first plug 26 and the second stop member 44 is proximate to and in contact with outer surface of the second plug 28 or elements extending its outer surface, such as coil spring 52. While the position of blade assembly 36 is nearest the first plug 26, a first state of maximal shaft extension exists wherein the first end portion 38 of shaft 30 is fully extended relative to the first plug 26 and the second end portion 50 correspondingly is fully retracted relative to the second plug 28.

In order to cushion the impact of the stop members 44,42 with their associated plugs 28,26, a first coil spring 48 and a second coil spring 52 are disposed along shaft 30. The first coil spring 48 serves as a first biasing means which remains in an non-compressed state until the blade assembly 36 approaches its first travel limit. Likewise, the second coil spring 52 serves as a second biasing means which remains in an non-compressed state until the blade assembly 36 approaches its second travel limit. In the preferred embodiment as shown in FIG. 3, the first travel limit has been approached causing the first coil spring 48 to become compressed, thereby creating a outward biasing force between the first plug 26 and the first stop member 42 and thus cushioning the upward impact with a return springing action. In the preferred embodiment as shown in FIG. 4, the second travel limit has been approached causing the second coil spring 52 to become compressed, thereby creating a outward biasing force between the second plug 28 and the second stop member 44 and thus cushioning the downward impact with a return springing action.

As previously noted, a compressed coil spring 48 effectively raises the surface of the first plug 26 and therefore it should be understood that the length of any compressed coil spring should be added to the relative position between the blade assembly and the stop member in order to properly establish the first and second travel limits.

Figure 2:
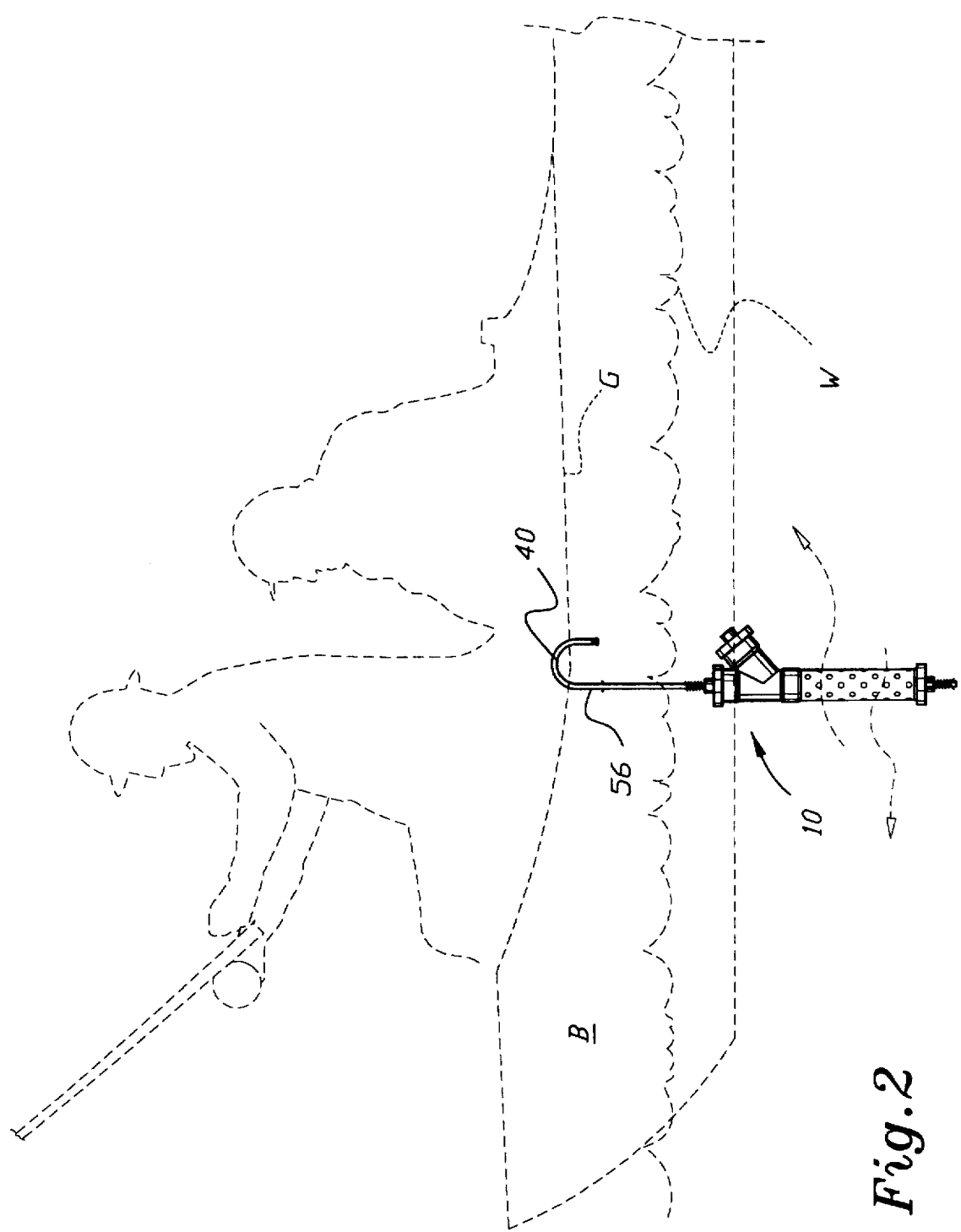
FIG. 2 is an side elevational view of the bait cutting and chumming device with environmental features shown in broken lines.

The shaft 30 further includes a predetermined length of shaft 30 added to the linear first end portion 38, proximate to the first stop member 42, defining a neck 56 extending a substantial length beyond the first stop member 42 such that the device 10 may be operated from a boat. Extending from the neck 56, a hook-like handle 40 is formed from the shaft 30 which may be easily grasped by the hand, as shown in FIG. 3 and FIG. 4, or hung on a receiving surface. One such suggested receiving surface is suggested in FIG. 2, wherein the device 10 is shown to be conveniently hung over the gunwale G of a boat B and submerged below the water line W. The predetermined length of the neck 56 may vary according to the hull height of certain watercraft. In accordance with such purpose, the neck 56 may also be structurally adapted between the handle portion 40 and the stop member 42 to be variably, adjustably, or extendably sized by such suggested means as threaded adaptor shafts or telescoping members, in order to accommodate different vessels having a gunwale at substantially different heights above the water.

To further facilitate the manual operation of the device and to permit the device 10 to be secured on the gunwale G of a boat B, the neck 56 terminates in an elongated handle portion 40 having a return bend. As previously suggested by FIG. 2, the return bend permits the shaft to be grasped or hung on a gunwale essentially in a vertical relationship to the waterline W; however, more conveniently, another receiving surface for the handle portion 40 is a rod holder, which is often mounted on the gunwale G having its mouth opening facing upward and at an acute angle from vertical facing towards the outboard of the boat B. Such a rod holder, having a generally standardized and limited mouth opening to securely fit a fishing rod, therefore requires that the cross-section of the handle portion 40 be of no greater diameter than the diameter associated with the standardized mouth opening. Moreover, the return bend should approximate 180 degrees (i.e. reversing the direction of the shaft of the handle portion so as to point the terminus of the handle portion towards the second end portion). This enables the handle portion 40 to be inserted into the rod holder so that the linear shaft 30 is positioned approximately parallel to the rod holder and thereby maintains an angle relative to the boat at approximately the same angle at which the rod holder is mounted. The inventor has determined that by maintaining this skewed relationship to the boat, the tubular body 14 is positioned underwater to orient the edges of each of the plurality of limiting perforations 16 at an angle to any horizontal current of water which increases the turbulence within the tubular body 14 which in turn stimulates passage of the smaller pieces of bait and fluids comprising a chum slick.

In operation, the device 10 is filled with whole bait, such as fish or squid, by removing a port plug 22 and passing the whole bait into the chamber 13 of the tubular body 14. To obtain a maximal effect of the cutting action of the blade assembly, whole bait should be added to sufficiently fill the entire chamber 13. The port plug 22 may then be replaced and the device 10 grasped by the handle portion 40 and suspended into the water such that at least the perforated tubular body 14 is immersed. By vigorously plunging and pulling the handle, the shaft 30 is caused to reciprocate and rotate within the chamber 13 while the tubular body 14 is buoyed by the water. The blade assembly 36 is thus passed over the whole bait and minces it. The vigorous action further causes the resulting chum to diffuse through the perforations 16 and into the surrounding water. As need dictates, the chumming device 10 can be periodically operated as above to refresh the resulting chum slick and refilled by use of the port opening 18. When the chumming operation is terminated, the threaded first and second plugs 26,28 allow a user to simply screw-off each plug to empty any remaining or expended chum or bait from the chamber 13 to easily clean the tubular body. The advantages over the prior art are clear: clean and easy loading of whole bait by use of a separate filling port, manual control over the freshness and amount of chum slick released, splatter-free operation during mincing of the bait, and clean, easy, and environmentally friendly expulsion of the remaining chum from the device.

It is to be understood that the present invention is not limited to the sole embodiment described above, but encompasses any and all embodiments within the scope of the following claims.

We claim:

1. A bait cutting and chumming device comprising:

an elongated rigid tubular body defining an inner chamber, said tubular body having a longitudinal axis, a first open end and a second open end and a plurality of perforations therein;

an enlarged port opening defined in a side of said tubular body for receiving bait and a removable port plug for occluding said port opening;

a rigid first plug removably inserted into said first open end and defining a first through bore disposed about said longitudinal axis;

a rigid second plug removably inserted into said second open end and defining a second through bore disposed about said longitudinal axis;

an elongated rigid shaft extending along said longitudinal axis within said inner chamber and passing through both said first through bore and said second through bore, said shaft further defining a first end portion extending a predetermined length beyond said first plug and a second end portion extending a predetermined length beyond said second plug, said first end portion terminating in an elongated neck and an elongated handle portion depending from said neck, said first end portion further having a first stop member for preventing passage of said first plug, and said second end portion having a second stop member for preventing passage of said second plug proximate to the terminus of said second end portion; and, a blade assembly affixed to said shaft within said chamber of said tubular body.

2. The bait cutting and chumming device according to claim 1, further including a first biasing means and a second biasing means, said first biasing means disposed between said first plug and said first stop member and said second biasing means disposed between said second plug and said second stop member.

3. The bait cutting and chumming device according to claim 1, wherein said blade assembly is positioned at a fixed location of said shaft and having travel limits within said inner chamber free of contact with said first plug during a first state of maximal shaft extension and further free of contact with said second plug in a second state of maximal shaft extension, said first state of maximal shaft extension defined by said second stop member being proximate to said second plug while said first end portion of said shaft is maximally extended beyond said first plug and said second state of maximal shaft extension defined by said first stop member being proximate to said first plug while said second end portion of said shaft is maximally extended beyond said second plug.

4. The bait cutting and chumming device according to claim 1, wherein said tubular body is internally threaded at said port opening to receive said port plug, each being matingly threaded for removable insertion.

5. The bait cutting and chumming device according to claim 1, wherein said port opening includes a tubular wall depending from said tubular body at an acute angle opening toward said first open end, thereby forming a Y-configuration.

6. The bait cutting and chumming device according to claim 1, wherein said tubular body is internally threaded at each said first open end and said second open end to receive said first plug and said second plug, respectively, each being matingly threaded for removable insertion.

7. The bait cutting and chumming device according to claim 1, wherein said blade assembly comprises four blades depending radially from a band dimensioned and configured in cross section to closely approximate and exceed the cross section of said shaft whereby said band may closely pass over said shaft and be secured thereto.

8. The bait cutting and chumming device according to claim 2, wherein said first biasing means and said second biasing means are each a coil spring of a predetermined length and passed longitudinally over said shaft such that each said coil spring is free to travel along said shaft between an associated stop member and an associated plug.

9. The bait cutting and chumming device according to claim 1, wherein each said first stop member and said second stop member is a removable pin passing radially through a diametric through bore defined in said shaft, each said pin extending laterally beyond said shaft a minimum length greater than the diameter of each said first through bore and said second through bore.

10. The bait cutting and chumming device according to claim 1, wherein said handle portion is an extension of said first end portion of said shaft having a return bend.

11. A bait cutting and chumming device comprising:

an elongated rigid tubular body defining an inner chamber, said tubular body having a longitudinal axis, a first open end and a second open end and a plurality of perforations therein;

an enlarged port opening defined in a side of said tubular body for receiving bait, said port opening including a tubular wall depending from said tubular body at an acute angle relative to said first open end, thereby forming a Y-configuration;

a removable port plug for occluding said port opening;

a rigid first plug removably inserted into said first open end and defining a first through bore disposed about said longitudinal axis;

a rigid second plug removably inserted into said second open end and defining a second through bore disposed about said longitudinal axis;

an elongated rigid shaft passing through both said first through bore and said second through bore, said shaft having a first end portion extending a predetermined length beyond said first plug and terminating in a neck of predetermined length and defining an elongated handle portion, said first end portion having a first stop member for preventing passage of said first plug, further having a second end portion extending a predetermined length beyond said second plug and terminating in a second stop member for preventing passage of said second plug;

a blade assembly affixed to said shaft within said tubular body, said blade assembly having travel limits within said inner chamber free of contact with said first plug during a first state of maximal shaft extension and further free of contact with said second plug in a second state of maximal shaft extension, said first state of maximal shaft extension defined by said second stop member being proximate to said second plug while said first end portion of said shaft is maximally extended beyond said first plug and said second state of maximal shaft extension defined by said first stop member being proximate to said first plug while said second end portion of said shaft is maximally extended beyond said second plug; and, a first biasing means and a second biasing means, said first biasing means disposed between said first plug and said first stop member and said second biasing means disposed between said second plug and said second stop member, wherein each said first biasing means and said second biasing means is a coil spring of a predetermined length and passed longitudinally over said shaft such that each said coil spring is free to travel along said shaft between an associated stop member and an associated plug.

12. The bait cutting and chumming device according to claim 11, wherein said tubular body is internally threaded at each said first open end, said second open end, and said port opening to receive said first plug, said second plug and said port plug, each being matingly threaded for removable insertion.

13. The bait cutting and chumming device according to claim 11, wherein said blade assembly comprises four blades depending radially from a band dimensioned and configured in cross section to closely approximate and exceed the cross section of said shaft whereby said band may closely pass over said shaft and be secured thereto.

14. The bait cutting and chumming device according to claim 11, wherein each said first stop member and said second stop member is a removable pin passing radially through a radial through bore defined in said shaft, each said pin extending laterally beyond said shaft a minimum length greater than the diameter of each said first through bore and said second through bore.

15. The bait cutting and chumming device according to claim 11, wherein said handle portion is an extension of said first end portion of said shaft having a return bend.

* * * * *